US008149817B2

(12) United States Patent
Simon et al.

(10) Patent No.: US 8,149,817 B2
(45) Date of Patent: Apr. 3, 2012

(54) SYSTEMS, APPARATUS, METHODS AND COMPUTER PROGRAM PRODUCTS FOR PROVIDING ATSC INTEROPERABILITY

(75) Inventors: Michael Simon, Frederick, MD (US); James Spilker, Woodside, CA (US); Scott Furman, Menlo Park, CA (US)

(73) Assignee: Rohde & Schwarz GmbH & Co. KG, Munich (DE)

( * ) Notice: Subject to any disclaimer, the term of this patent is extended or adjusted under 35 U.S.C. 154(b) by 1098 days.

(21) Appl. No.: 12/024,238

(22) Filed: Feb. 1, 2008

(65) Prior Publication Data

US 2008/0211969 A1 Sep. 4, 2008

Related U.S. Application Data

(60) Provisional application No. 60/887,652, filed on Feb. 1, 2007.

(51) Int. Cl.
*H04J 3/06* (2006.01)

(52) U.S. Cl. ........................................................ 370/350

(58) Field of Classification Search ........................ None
See application file for complete search history.

(56) References Cited

U.S. PATENT DOCUMENTS

| | | | |
|---|---|---|---|
| 5,216,503 | A | 6/1993 | Paik et al. |
| 5,506,844 | A | 4/1996 | Rao |
| 5,614,914 | A | 3/1997 | Bolgiano et al. |
| 5,903,574 | A | 5/1999 | Lyons |
| 6,005,605 | A | 12/1999 | Kostreski et al. |
| 6,088,337 | A | 7/2000 | Eastmond et al. |
| 6,130,898 | A | 10/2000 | Kostreski et al. |
| 6,192,070 | B1 | 2/2001 | Poon et al. |
| 6,269,092 | B1 | 7/2001 | Schilling |
| 6,313,885 | B1 | 11/2001 | Patel et al. |
| 6,324,186 | B1 | 11/2001 | Mahn |
| 6,414,720 | B1 | 7/2002 | Tsukidate et al. |
| 6,477,180 | B1 | 11/2002 | Aggarwal et al. |
| 6,480,236 | B1 | 11/2002 | Limberg |
| 6,496,477 | B1 | 12/2002 | Perkins et al. |
| 6,631,491 | B1 | 10/2003 | Shibutani et al. |
| 6,640,239 | B1 | 10/2003 | Gidwani |
| 6,721,337 | B1 | 4/2004 | Kroeger et al. |
| 6,727,847 | B2 | 4/2004 | Rabinowitz et al. |

(Continued)

FOREIGN PATENT DOCUMENTS

DE 199 60 295 6/2001

(Continued)

OTHER PUBLICATIONS

ATSC Digital Television Standard (A/53) Revision E, Advanced Television Systems Committee, Dec. 27, 2005.

(Continued)

*Primary Examiner* — Anh-Vu Ly

(74) *Attorney, Agent, or Firm* — Fitzpatrick, Cella, Harper & Scinto

(57) ABSTRACT

Systems, apparatus, methods and computer program products are provided for causing a dataframe to be emitted at an air interface of an antenna. A memory stores a transmission to antenna delay value (TAD). An offset calculator calculates an offset value based on an epoch of a global timebase generator and the transmission to antenna delay value (TAD). An interface controller in communication with the offset calculator communicates a segment synchronization signal and a field synchronization signal based on the offset value.

18 Claims, 14 Drawing Sheets

U.S. PATENT DOCUMENTS

| | | | |
|---|---|---|---|
| 6,728,467 | B2 | 4/2004 | Oshima |
| 6,772,434 | B1 | 8/2004 | Godwin |
| 6,801,499 | B1 | 10/2004 | Anandakumar et al. |
| 6,804,223 | B2 | 10/2004 | Hoffmann et al. |
| 6,816,204 | B2 | 11/2004 | Limberg |
| 6,861,964 | B2 | 3/2005 | Breti et al. |
| 6,862,707 | B2 | 3/2005 | Shin |
| 6,879,720 | B2 | 4/2005 | Sarachik et al. |
| 6,930,983 | B2 | 8/2005 | Perkins et al. |
| 6,996,133 | B2 | 2/2006 | Bretl et al. |
| 7,110,048 | B2 | 9/2006 | Weiss |
| 7,111,221 | B2 | 9/2006 | Birru et al. |
| 7,197,685 | B2 | 3/2007 | Limberg |
| 7,310,354 | B2 | 12/2007 | Fimoff et al. |
| 7,324,545 | B2 | 1/2008 | Chuah et al. |
| 7,336,646 | B2 | 2/2008 | Muller |
| 7,349,675 | B2 | 3/2008 | Karr et al. |
| 7,382,838 | B2 | 6/2008 | Peting |
| 7,496,094 | B2 | 2/2009 | Gopinath et al. |
| 7,532,677 | B2 | 5/2009 | Simon |
| 7,532,857 | B2 | 5/2009 | Simon |
| 7,539,247 | B2 | 5/2009 | Choi et al. |
| 7,551,675 | B2 | 6/2009 | Kroeger |
| 7,558,279 | B2 | 7/2009 | Hwang et al. |
| 7,564,905 | B2 | 7/2009 | Park et al. |
| 7,593,474 | B2 | 9/2009 | Jeong et al. |
| 7,599,348 | B2 | 10/2009 | Kang et al. |
| 7,667,780 | B2 | 2/2010 | Weiss |
| 7,702,337 | B2 | 4/2010 | Vare et al. |
| 7,715,491 | B2 | 5/2010 | Yu et al. |
| 7,733,819 | B2 | 6/2010 | Lee et al. |
| 7,779,327 | B2 | 8/2010 | Lee et al. |
| 7,783,316 | B1 | 8/2010 | Mitchell |
| 7,801,181 | B2 | 9/2010 | Song et al. |
| 7,804,909 | B2 | 9/2010 | Choi et al. |
| 7,822,134 | B2 | 10/2010 | Kim et al. |
| 7,830,974 | B2 | 11/2010 | Choi et al. |
| 7,852,961 | B2 | 12/2010 | Chang et al. |
| 7,856,590 | B2 | 12/2010 | Kim et al. |
| 7,933,351 | B2 | 4/2011 | Kim et al. |
| 8,009,662 | B2 | 8/2011 | Lee et al. |
| 2001/0017849 | A1 | 8/2001 | Campanella et al. |
| 2002/0085548 | A1 | 7/2002 | Ku et al. |
| 2003/0099303 | A1 | 5/2003 | Birru et al. |
| 2003/0206596 | A1 | 11/2003 | Carver et al. |
| 2005/0013249 | A1 | 1/2005 | Kong et al. |
| 2005/0074074 | A1 | 4/2005 | Limberg |
| 2005/0084023 | A1 | 4/2005 | Bott et al. |
| 2005/0147186 | A1* | 7/2005 | Funamoto et al. ............ 375/324 |
| 2005/0207416 | A1 | 9/2005 | Rajkotia |
| 2005/0238100 | A1 | 10/2005 | Hsiao et al. |
| 2005/0249300 | A1 | 11/2005 | Jeong et al. |
| 2005/0249301 | A1 | 11/2005 | Jeong et al. |
| 2006/0050770 | A1 | 3/2006 | Wallace et al. |
| 2006/0200852 | A1 | 9/2006 | Simon |
| 2006/0200853 | A1 | 9/2006 | Simon |
| 2006/0244865 | A1 | 11/2006 | Simon |
| 2006/0245516 | A1 | 11/2006 | Simon |
| 2006/0246836 | A1* | 11/2006 | Simon .......................... 455/3.01 |
| 2007/0066272 | A1 | 3/2007 | Vassiliou et al. |
| 2007/0143810 | A1 | 6/2007 | Yousef |
| 2007/0189410 | A1 | 8/2007 | Zeng |
| 2007/0223612 | A1* | 9/2007 | Simon .......................... 375/265 |
| 2007/0230460 | A1 | 10/2007 | Jeong et al. |
| 2008/0247442 | A1 | 10/2008 | Orlik et al. |
| 2008/0273698 | A1 | 11/2008 | Manders et al. |
| 2009/0016435 | A1 | 1/2009 | Brandsma et al. |
| 2009/0175355 | A1 | 7/2009 | Gordon et al. |
| 2009/0193487 | A1* | 7/2009 | Simon .......................... 725/118 |
| 2009/0201997 | A1 | 8/2009 | Kim et al. |
| 2009/0225872 | A1* | 9/2009 | Simon ...................... 375/240.27 |
| 2009/0252266 | A1 | 10/2009 | Heinemann et al. |

FOREIGN PATENT DOCUMENTS

| | | |
|---|---|---|
| DE | 196 17 293 | 11/2001 |
| DE | 101 12 773 | 9/2002 |
| DE | 10 2006 015 393 | 10/2007 |
| DE | 10 2007 012 465 | 5/2008 |
| EP | 0 837 609 | 4/1998 |
| EP | 0 926 894 | 6/1999 |
| EP | 1 670 150 | 6/2006 |
| EP | 1 753 249 | 2/2007 |
| GB | 2 399 719 | 9/2004 |
| WO | WO-02/03728 | 1/2002 |
| WO | WO-03/009590 | 1/2003 |
| WO | WO-03/045064 | 5/2003 |
| WO | WO-2004/062283 | 7/2004 |
| WO | WO-2007/114653 | 10/2004 |
| WO | WO-2006/046107 | 5/2006 |
| WO | WO-2006/066617 | 6/2006 |
| WO | WO-2006/084361 | 8/2006 |
| WO | WO-2007/046672 | 4/2007 |
| WO | WO-2008/042694 | 4/2008 |
| WO | WO-2009/016175 | 2/2009 |
| WO | WO-2010/000407 | 1/2010 |

OTHER PUBLICATIONS

ATSC Recommended Practice: Design of Synchronized Multiple Transmitter Networks (A/111), Advanced Television Systems Committee, Sep. 3, 2004.

ATSC Standard: Synchronization Standard for Distributed Transmission (A/110), Advanced Television Systems Committee, Jul. 14, 2004.

ATSC Standard: Synchronization Standard for Distributed Transmission, Revision A (A/110A), Advanced Television Systems Committee, Jul. 19, 2005.

ATSC Technology Group Report: DTV Signal Reception and Processing Considerations, Doc. T3-600r4, Advanced Television Systems Committee, Sep. 18, 2003.

Battisa, "Spectrally Efficient High Data Rate Waveforms for the UFO SATCOM Channel", Military Communications Conference, MILCOM 98, Proceedings, Oct. 18-21, 1998, pp. 134-139, IEEE vol. 1.

Citta, R., et al., "ATSC Transmission System: VSB Tutorial", Zenith Electronics Corporation, Symposium Handout, Montreuz Symposium, Jun. 12, 1997.

"Digital Video Broadcasting (DVB); DVB Mega-Frame for Single Frequency Network (SFN) Synchronization", European Broadcasting Union; eTSI TS 101 191 v1.4.1, Jun. 2004.

International Preliminary Report on Patentability, PCT/US2006/007265, Oct. 4, 2007.

International Preliminary Report on Patentability, PCT/EP2008/000837, Aug. 6, 2009.

International Preliminary Report on Patentability, PCT/US2006/020599, Nov. 30, 2007.

International Preliminary Report on Patentability, PCT/US2006/022300, Dec. 27, 2007.

International Search Report and Written Opinion of the International Searching Authority, PCT/EP2008/000837, Aug. 12, 2008.

International Search Report and Written Opinion of the International Searching Authority, PCT/US2006/007251, May 20, 2008.

International Search Report and Written Opinion of the International Searching Authority, PCT/US2006/007265, Sep. 4, 2007.

International Search Report and Written Opinion of the International Searching Authority, PCT/US2006/015317, May 14, 2008.

International Search Report and Written Opinion of the International Searching Authority, PCT/US2006/020599, Aug. 31, 2007.

International Search Report and Written Opinion of the International Searching Authority, PCT/US2006/022300, Mar. 29, 2007.

Lecture 4: Digital Television the DVB transport stream, obtained from http://www.abo.fi/~jbjorkqv/digitv/lect4.pdf (last visited May 4, 2006).

Lee, Y., et al., "ATSC Terrestrial Digital Television Broadcasting Using Single Frequency Networks", ETRI Journal, Apr. 2004, pp. 92-100, vol. 26, No. 2.

Owen, H., "Proposed Modifications to ATSC Digital Television Standard to Improve Performance in the Face of Dynamic Multipath for Both Fixed and Mobile Operation", Sarnoff Corporation, Apr. 2, 2001, Princeton, New Jersey.

Patel, C. B., et al., "Proposal to ATSC Subcommittee T3/S9 to Provide 8-VSB With a Repetitive-PN1023 Signal for Rapidly and Reliably Initializing Tracking in an Adaptive Equalizer Despite Adverse Multipath Conditions", Apr. 12, 2001.
Proposal for Enhancement of ATSC RF Transmission System (Revision to A/53), submitted by Samsung, Draft ver. 1.0, Sep. 16, 2004.
Raghunandan, K., "Satellite Digital Audio Radio Service (SDARS) System Architecture and Receiver Review", IEEE, Oct. 27, 2005.
Vogel, W. J., et al., "Propagation Effects and Satellite Radio Design", Paper No. 1445, Maastricht Exhibition and Congress Centre (MECC), Aug. 17-24, 2002, Maastricht, the Netherlands.
Wang, "A New Implementation of Single Frequency Network Based on DMB-T", 2004 International Conference on Communications, Circuits and Systems (2004 ICCCAS), Jun. 27-29, 2004, pp. 246-249, vol. 1.
Wang, X., et al., "Transmitter Identification in Distributed Transmission Network and Its Applications in Position Location and a New Data Transmission Scheme", NAB Broadcast Engineering Conference, Apr. 16-21, 2005, pp. 511-520, Las Vegas, Nevada.
Whitaker, J. C., "Standard Handbook of Video and Television Engineering", Chapter 17.2 "ATSC DTV Received Systems", 2000, pp. 17-63 to 17-99.
ATSC Digital Television Standard (A/53), "Annex D: RF/Transmission Systems Characteristics", Sep. 16, 1995, pp. 46-60.
"European Broadcasting Union Union Europeenne de Radio-Television Digital Video Broadcasting (DVB); Specification for Service Information (SI) in DVB systems; ETS 300 468", ETSI Standards, Lis, Sophia Antipolis Cedex, France, vol. BC, Second Edition, Jan. 1, 1997, pp. 1-72.

* cited by examiner

302 $\text{ATSC Symbol Rate } (S_r) \text{ Sym/Sec} = \frac{27000000}{6} \times \frac{1}{286} \times 684 = 10{,}762{,}237.762237762200 \text{ Sym/Sec}$ 304 $\text{Symbol}_{Period} = \frac{1}{S_r} = 0.000000092917478882 \text{ Seconds}$ 306 $\text{Symbols}_{Frame} = 832 \text{ Sym/Seg} \times 626 \text{ Seg/Frame} = 520{,}832 \text{ Sym/Frame}$ 308 $\text{ATSC\_Frames}_{Superframe} = 20 \text{ Frames/SF}$ 310 $\text{Symbols}_{Superframe} = 520{,}832 \text{ Sym/Frame} \times 20 \text{ Frames/SF} = 10{,}416{,}640 \text{ Symbols/SF}$ 312 $\text{Superframe}_{Period} = \frac{1}{S_r} \times \text{Sym}_{Superframe} = 0.967887927225471088 \text{ Seconds} = 1 \text{ Superframe}_{Tick}$ 314 $\text{ATSC Epoch}_{Time} = \text{January 6, 1980 00:00:00 UTC}$

FIG. 3

500B

516 $$\text{SuperframeOffset}_{NS}\text{ (to next GPS 1PPS)} = \text{Next GPS}_{Seconds}\text{Count} \times \frac{1}{\text{Superframe}_{Period}} = \textit{Integer.fraction}\text{ (Superframes)}$$

518 $$\text{Offset}_{NS}\text{ to next GPS 1PPS} = \textit{fraction} \times \text{Superframe}_{Period}$$

520 $$\text{Superframes } t_1 = 851{,}472{,}000 \times \frac{1}{0.967887927225471088} = 879{,}721{,}686.82877702000000$$

522 $$\text{TimeOffset}_{NS} = \textit{fraction} \times \text{Superframe}_{Period}$$
$$= .82877702000000 \times 0.967887927225471088 = 0.802163272019902796 = 802{,}163{,}272.0_{NS}$$

FIG. 5B

524 $TS_{rate} = 2 \times (188\ \text{Packets}/208\ \text{Seg}) \times (312\ \text{Seg}/313\ \text{Seg}) \times (684/286) \times (4.5 \times 10^6\ \text{Hz})$ $= 19.392658\ \text{Mbps}$ 526 Relationship GPS 10 MHz and $TS_{rate}$: $TS_{rate} = 1 \times 10^7 \times (433998/223795)$ 528 Relationship $TS_{rate}$ and Symbol rate $S_r$: $S_r = (313/564) \times TS_{rate}$ 530 $\text{Superframe}_{period} = (624\ \text{packets/frame}) \times (20\ \text{frames}) = 12{,}480\ \text{TS Packets}$

FIG. 5C

806 { VFIP Release = $1PPSF_{period}$ – Max Delay

950

SYSTEMS, APPARATUS, METHODS AND COMPUTER PROGRAM PRODUCTS FOR PROVIDING ATSC INTEROPERABILITY

CROSS REFERENCE TO RELATED APPLICATIONS

This application claims priority to, and the benefit of, U.S. Provisional Patent Application Ser. No. 60/887,652, filed Feb. 1, 2007, which is hereby incorporated by reference in its entirety.

BACKGROUND

1. Field

Example aspects of the present invention generally relate to systems operating under the ATSC Digital Television Standard (A/53), and more particularly to providing ATSC interoperability by using an external time reference to synchronize the emission of data packets.

2. Related Art

The Digital Television ("DTV") Standard (or A/53 standard) established by the Advanced Television Systems Committee ("ATSC") describes the parameters of a system including video/audio encoders, preprocessing/compression parameters, associated multiplexer/transport layer characteristics and normative specifications, and the vestigial-sideband radio-frequency ("VSB RF") transmission subsystem. Television stations conforming to the standard typically transmit 8-VSB dataframes without regular or known time relationships. This is because the A/53 standard does not specify when a VSB frame should be emitted from a station.

Under the existing ATSC DTV standard, the ATSC symbol clock is not locked to a GPS reference (e.g., 5 or 10 MHz reference signals) and has a tolerance of +/−30 Hz. The VSB dataframes among stations thus have a random frequency and phase relationship causing exciters at different geographic locations to be unsynchronized. As a result, typical ATSC systems do not have an external reference that a remote station can use to lock its data framing.

A modification to the conventional 8-VSB modulation system based on the ATSC transmission standard has been proposed. The modification, referred to as advanced VSB, or A-VSB, builds on the existing ATSC transmission standard to enhance the ability of an ATSC DTV station to transmit signals to new mobile or handheld receivers in dynamic environments while maintaining backward compatibility with legacy ATSC DTV receivers. The proposed A-VSB system also facilitates synchronization of transmitted signals from multiple transmission towers, which improves coverage with higher, more uniform signal strength throughout a service area, even in locations that normally would be shielded by obstacles such as hills or buildings.

U.S. patent application Ser. No. 11/422,791, entitled "APPARATUS, SYSTEMS AND METHODS FOR PROVIDING TIME DIVERSITY FOR MOBILE BROADCAST SERVICES" describes exemplary mechanisms for providing enhancements to ATSC networks using synchronous VSB frame slicing in single transmitter and single frequency networks, and for providing time diversity for mobile broadcasters. FIG. 1 illustrates the construction of what is referred to in that patent application as a "superframe" 106. A superframe 106 is a series of VSB dataframes 104, each of which includes 624 transport stream (TS) packets 102. As shown in FIG. 1, a VSB frame initialization packet (VFIP) can be inserted as the last packet slot of a series of TS packets (102). By the placement of a VFIP in the last packet slot (i.e., packet slot 623), signaling of a VSB frame is made implicit. Upon reception of the VFIP, components such as exciters (not shown) can be signaled to start a new data VSB frame after the last bit of VFIP packet is received. After the first VFIP insertion, additional VFIPs can be inserted at a predetermined periodicity (e.g., approximately once per second).

Data content, such as datacasting data content having news, weather, sports information, and the like, can be inserted into slices within a subset of dataframes (e.g., dataframes 1-3, 4-9, 10-15, 16-20). Slices can be inserted on a dynamic basis since the signaling provides receiving devices with a deterministic mapping as to when the service content will be broadcast. These VSB frames can be multiplexed to generate the superframe 106. RF transmission systems can then broadcast a stream of superframes 106 to mobile or handheld receivers.

BRIEF DESCRIPTION

The example embodiments described herein provide methods, systems and computer program products for providing ATSC interoperability, which are now described herein in terms of an example ATSC network.

In an example embodiment, systems, apparatus, methods and computer program products are provided for causing a dataframe to be emitted at an air interface of an antenna including a memory configured to store a transmission to antenna delay value (TAD). Also included is an offset calculator configured to calculate an offset value based on an epoch of a global timebase generator and the transmission to antenna delay value (TAD). An interface controller in communication with the offset calculator is configured to communicate a segment synchronization signal and a field synchronization signal based on the offset value.

In another example embodiment, systems, apparatus, methods and computer program products are provided for causing the release of a VSB frame initialization packet into a distribution network, including an offset calculator configured to calculate an offset between a next edge of a pulse signal of a global timebase and a start of a superframe. Also included is a timing calculator configured to calculate a release time based on the offset and a maximum delay value of the distribution network. An interface controller is configured included to control an emission multiplexer to release the VSB frame initialization packet at the release time.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments of the invention presented herein will become more apparent from the detailed description set forth below when taken in conjunction with the drawings in which like reference numbers indicate identical or functionally similar elements.

FIG. 3 describes example definitions and implementations of ATSC A-VSB system time metrics in accordance with one embodiment of the present invention.

FIGS. 5A, 5B and 5C depict example calculations, implementations and timing relationships for deriving an offset to initialize a cadence in accordance with an embodiment of the present invention.

DETAILED DESCRIPTION

The example embodiments of the invention presented herein are directed to systems, apparatus, methods and computer program products for providing ATSC interoperability, which are now described herein in terms of an example ATSC network. This description is not intended to limit the application of the example embodiments presented herein. In fact, after reading the following description, it will be apparent to one skilled in the relevant art(s) how to implement the following example embodiments in alternative embodiments, such as satellite broadcast systems, Digital Video Broadcast (DVB) systems, digital radio broadcast systems, and other systems that transmit packets.

Generally, the example embodiments described herein provide the existing ATSC infrastructure with the ability to provide mobile or handheld devices (collectively referred to as "wireless devices") the ability to receive information in a synchronized manner, where the synchronization is based on a global timebase such as the Global Positioning System (GPS) timebase. This is accomplished by setting the specific time an exciter releases a physical layer dataframe (e.g., 8-VSB or A-VSB) and maintaining the cadence of subsequent dataframes. In addition, an emission multiplexer (e.g., in a studio) can be controlled to synchronize packets carrying program content, such that when the packets are encapsulated into dataframes by an exciter, the content will be emitted from the air interface of respective antennas at the substantially the same time.

Figure 2:
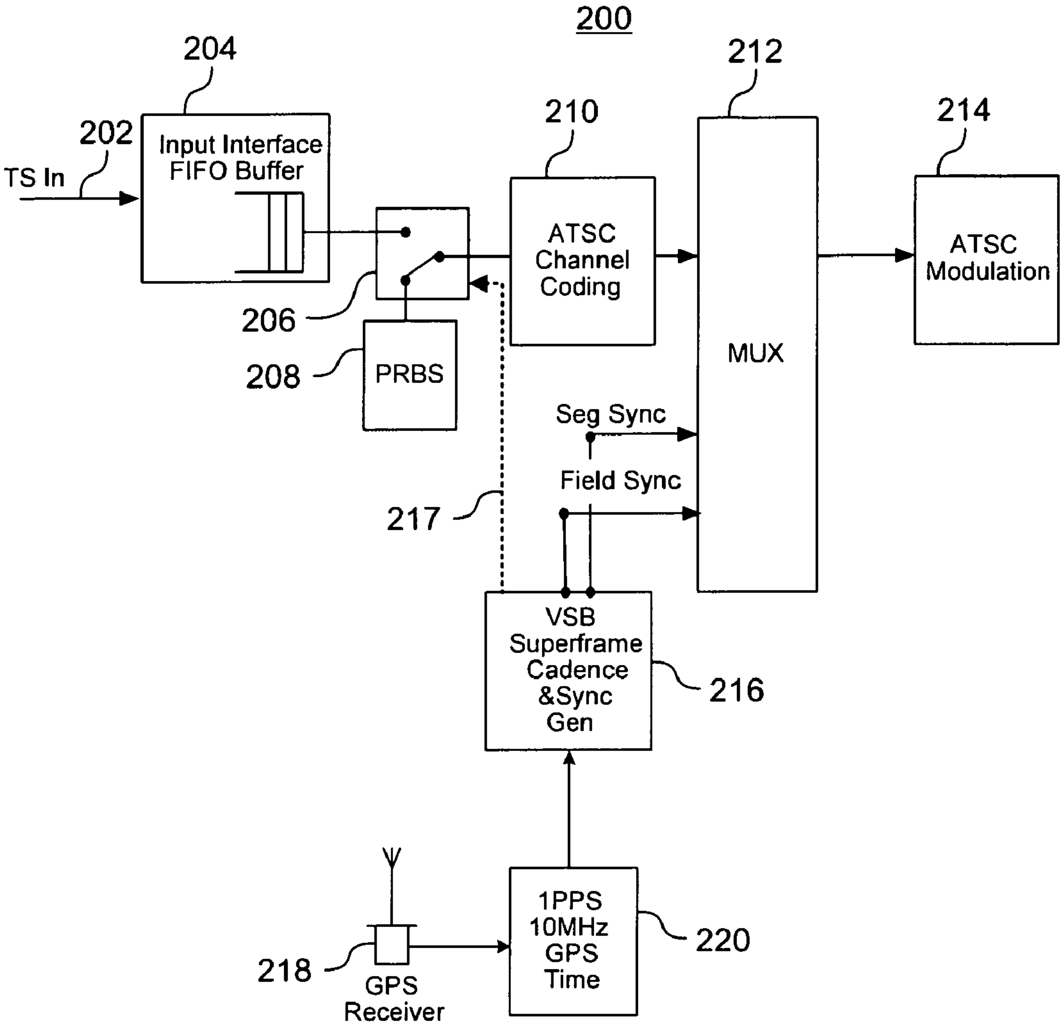
FIG. 2 depicts a block of an example exciter system in accordance with one embodiment of the present invention.

FIG. 2 depicts a block of an example exciter system 200 in accordance with one embodiment of the present invention. Exciter system 200, shown in an unsynchronized state, includes an input interface first-in-first-out ("FIFO") buffer 204 which receives and buffers a transport stream 202 ("TS"). Hereinafter, an input interface FIFO buffer is referred to as a FIFO buffer. A pseudo-random binary sequence ("PRBS") generator 208 generates a random sequence of bits. Exciter 200 also includes a switch 206, which feeds either the PRBS generator 208 or the buffered transport stream from FIFO buffer 204 to an ATSC channel coding unit 210 (also referred to simply as "coding unit"). The coding unit 210 is coupled to a multiplexer 212. Switch 206 is controlled by a cadence generator 216 via control line 217. Until the dataframes transmitted through exciter 200 are locked, switch 206 is controlled by the cadence generator 216 to connect PRBS generator 208 to coding unit 210.

A global timebase receiver 218, such as a GPS receiver, receives global timebase signals 220 including a 1 pulse per second (1 PPS) timing output, standard reference output frequencies (e.g., 5 and 10 MHz) which can be used to derive the ATSC symbol clock in 200 exciter, and a GPS week and time of week ("TOW") count which can be expressed as an integer corresponding to the number of seconds since the GPS epoch. The GPS epoch is Jan. 6, 1980 at 00:00:00 UTC.

A similar global timebase receiver also is used to derive the transport stream clock in an emission multiplexer (not shown) discussed in more detail below. As shown in FIG. 2, the timebase signals 220 are fed to the cadence generator 216.

It should be understood that other universal timebase systems can be utilized to define a global timebase reference, such as Russia's Global Navigation Satellite System (GLONASS) and Europe's proposed Galileo navigation system.

Cadence generator 216 provides segment synchronization and field synchronization signals to multiplexer 212 in accordance with the ATSC A/53 standard. In addition, cadence generator 216 calculates timing offsets from the global timebase signals to determine the instant superframes will be emitted from the air interface of an antenna (not shown). After calculating the offset values, and at an appropriate time determined by the offsets, cadence generator 216 actuates switch 206 via control line 217 to connect FIFO buffer 204 to coding unit 210 (assuming a TS stream has been buffered). The synchronized transport streams are coded as segments by channel coding unit 210 and multiplexed into VSB frames by multiplexer 212. The VSB frames are then modulated by an ATSC modulation stage 214 to be transmitted.

FIG. 3 describes example definitions and implementations of ATSC 8-VSB system time metrics in accordance with an embodiment of the present invention. Equation 302 is the existing definition of an ATSC symbol rate ($S_r$) and equation 304 defines the corresponding symbol period ($Symbol_{Period}$). Based on the number of symbols per segment ("Sym/Seg") and segments per frame ("Seg/Frame"), the number of symbols per frame, $Symbols_{Frame}$, can be calculated as shown by equation 306, particularly by multiplying the number of symbols per segment by the number of segments per frame.

Figure 1:
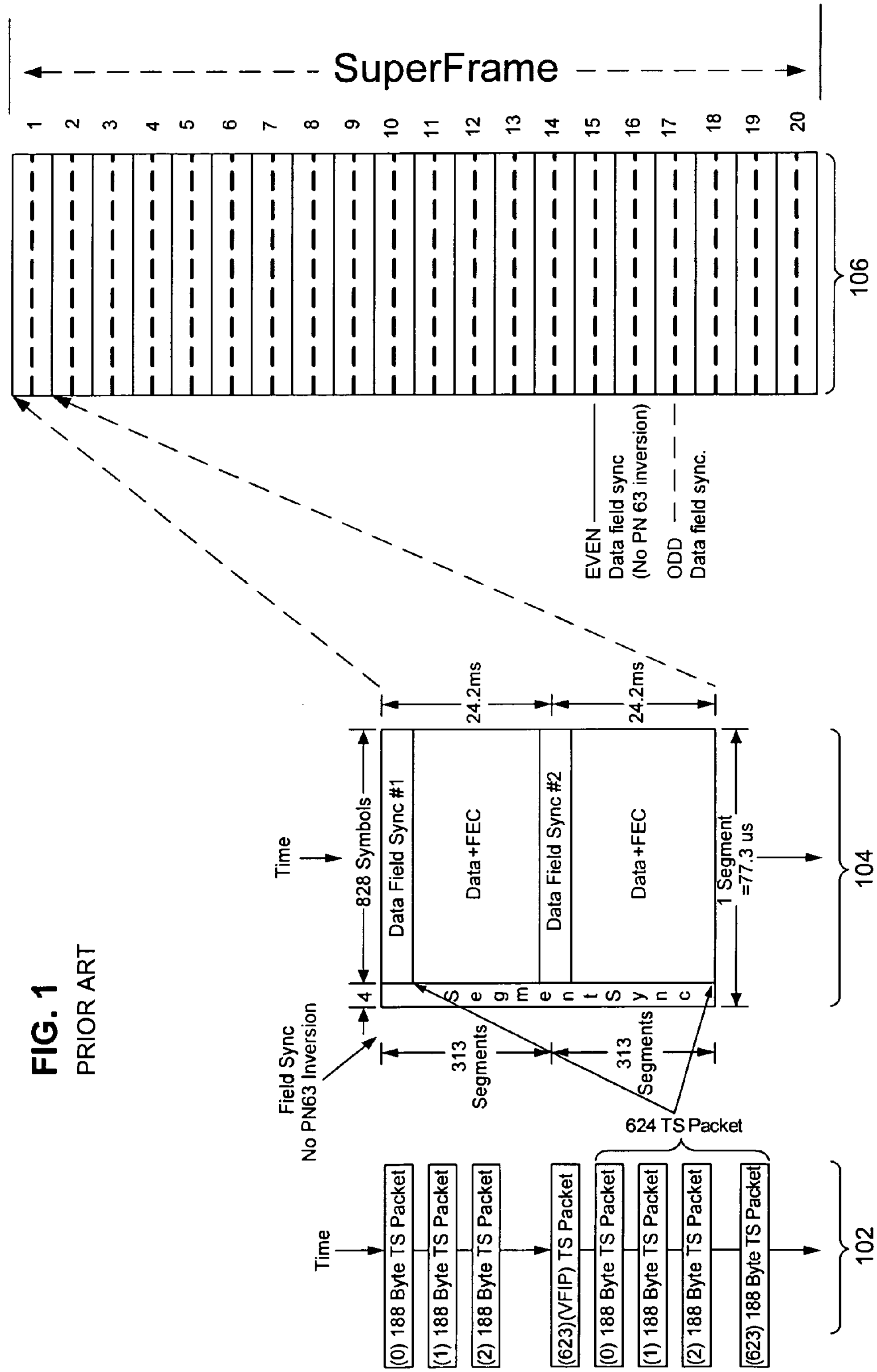
FIG. 1 PRIOR ART
FIG. 1 depicts the construction of an exemplary prior art superframe.

As shown by equation 308, in an example embodiment, a superframe, $ATSC\_Frames_{Superframe}$, includes twenty (20) frames (FIG. 1, 106). The number of symbols in a superframe, $Symbols_{Superframe}$, is defined by equation 310 and in the example embodiment equals 10,416,640 symbols. A corresponding superframe period, $Superframe_{Period}$, is defined by equation 312 as the number of symbols in a superframe (i.e., $Symbols_{Superframe}$) multiplied by the symbol period (i.e., $Symbol_{Period}$) 304. A periodic superframe signal is sometimes referred to as a superframe "tick" or simply "SF tick." A global timebase epoch, referred to herein as the "ATSC epoch" is defined to be equal to the GPS epoch, namely Jan. 6, 1980 00:00:00 UTC, as shown by definition 314.

Figure 4:
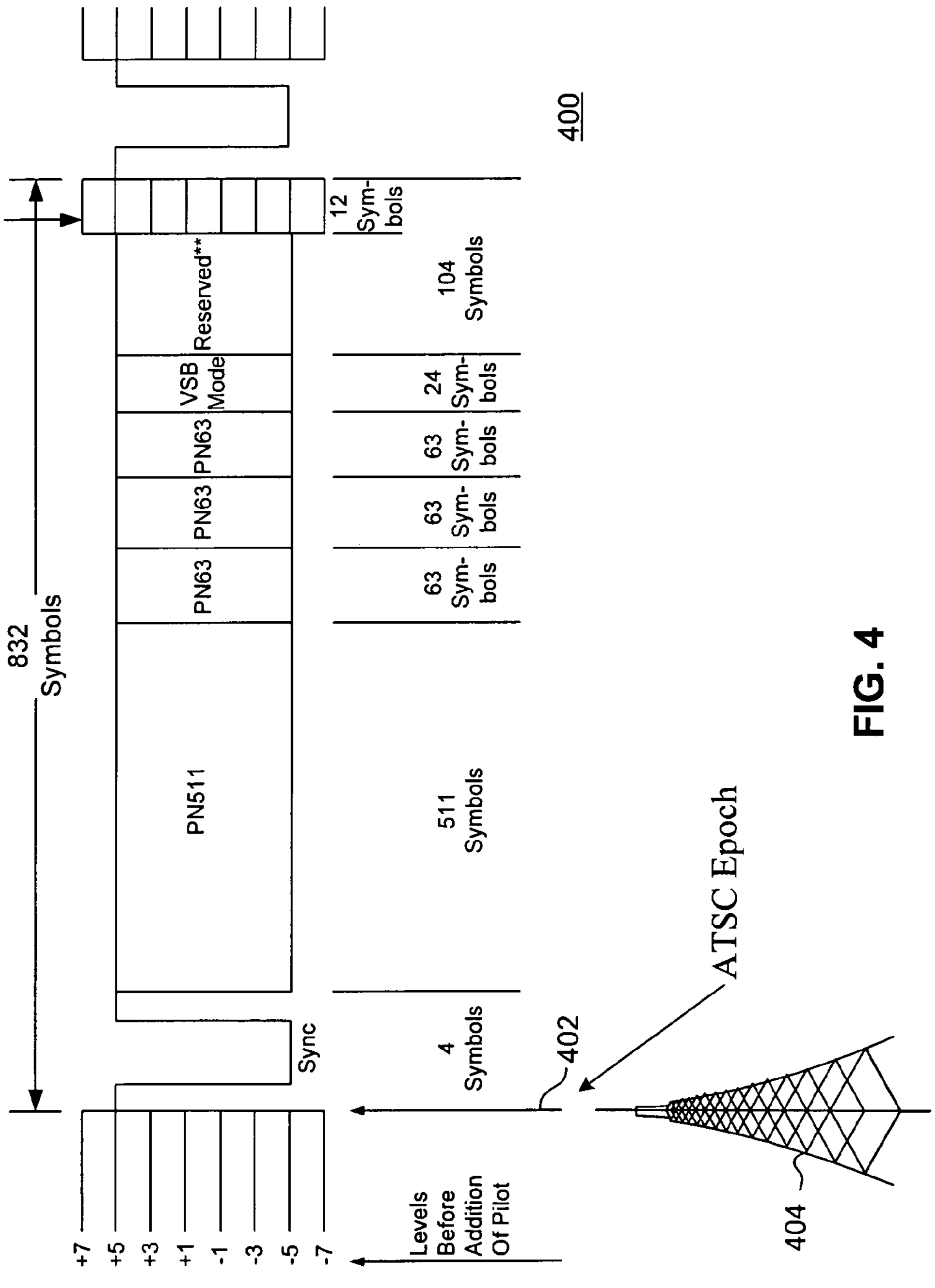
FIG. 4 illustrates a data field sync (DFS) waveform and its relationship to the definition of an ATSC epoch in accordance with an embodiment of the present invention.

FIG. 4 illustrates a data field sync (DFS) waveform 400 and its relationship to the definition of an ATSC epoch in accordance with an example embodiment of the present invention. As shown in FIG. 4, the ATSC epoch 402 is defined as the instant the leading edge (zero crossing) of the +5 to −5 transition of the segment synchronization symbol (Sync) of a DFS waveform having no PN 63 inversion and representing the start of the first superframe was emitted at an air interface of an antenna 404 for all ATSC DTV stations.

Referring again to FIG. 2, cadence generator 216 uses the system time metrics described above to determine an offset for a superframe, based on the ATSC epoch 402. The offset calculated at one geographical location also can be calculated by cadence generators at other geographic locations, permitting the physical layer VSB Frames of different stations to become phase synchronized.

In another example embodiment, a cadence generator also can be coupled to or placed within an A-VSB emission multiplexer (to be described later) to synchronize TS packets. As explained above, a cadence generator in the exciter is used to synchronize the physical layer VSB dataframes. By incorporating a cadence generator to control the release of TS packets from the emission multiplexer to the exciter over a distribution network, program content emitted from an exciter (with a cadence generator) can be synchronized to transmit the program content from the air interface of the respective antennas at substantially the same time or at a known offset.

Figure 5A:
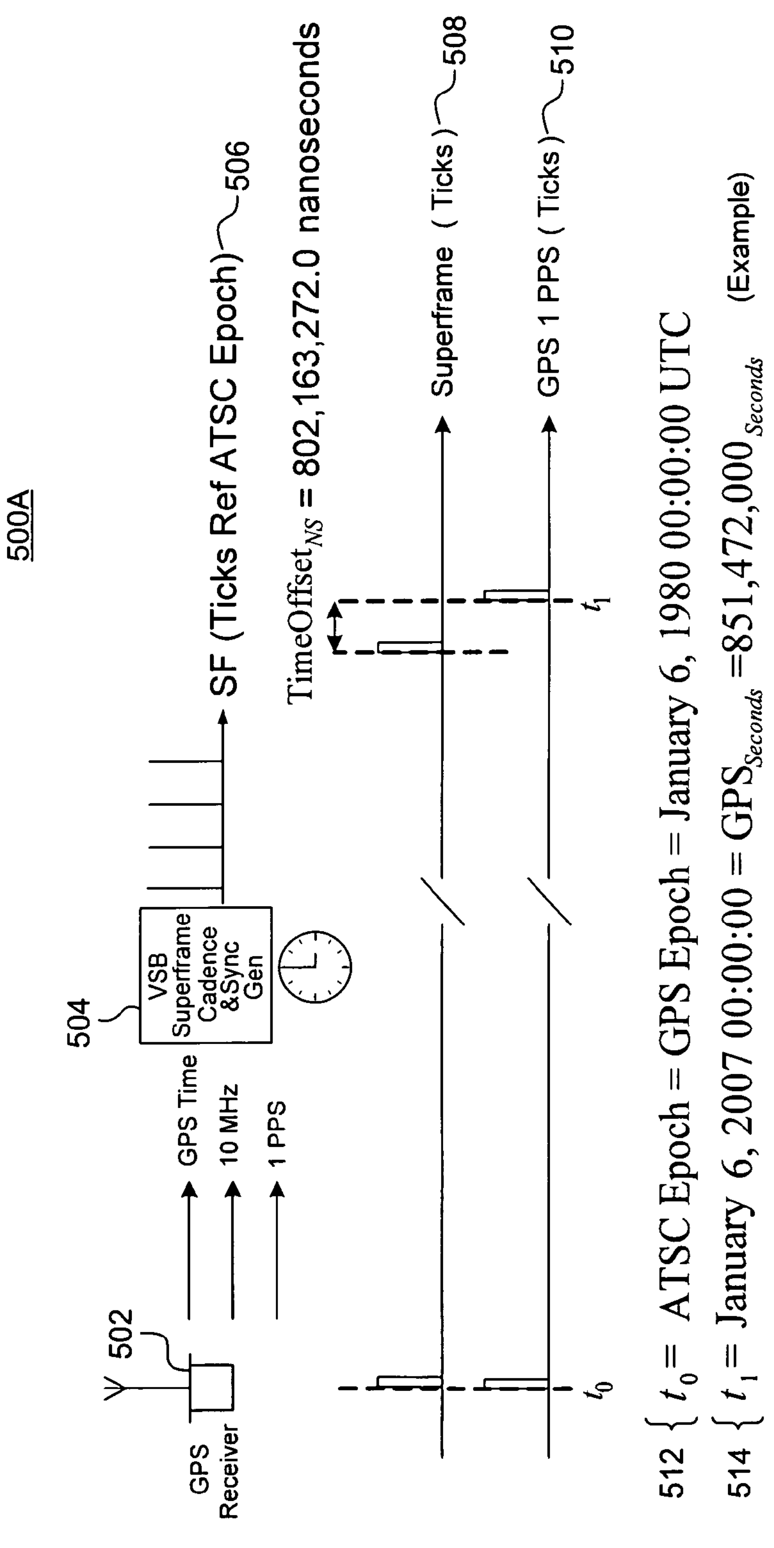

FIGS. 5A, 5B, and 5C depict example calculations, implementations and timing relationships for deriving an offset to initialize a cadence in accordance with an embodiment of the present invention. Timeline 508 illustrates how many superframes (i.e., SF ticks) would have occurred since time $t_0$ (512) and timeline 510 illustrates how many global timebase pulses (e.g., GPS 1 PPS pulses or GPS ticks) have occurred since time $t_0$ (512), where time to is the ATSC epoch defined above (i.e., Jan. 6, 1980 at 00:00:00 UTC). Time $t_1$ (514) is an exemplary future time, Jan. 6, 2007 at 00:00:00 UTC, and can be set to any time after Jan. 6, 1980 00:00:00 UTC. A timebase receiver, such as the GPS receiver 502, feeds the global timebase signals to a cadence generator 504. As described above, timebase signals in the example embodiment include GPS time (i.e., weeks, time of week ("TOW") in seconds), a 10 MHz signal, and a clock pulse of 1 pulse per second (1 PPS).

The VSB dataframes among stations will have a random frequency and phase relationship and hence typical exciters at different locations are not synchronized. Cadence generator 504 controls when the dataframes are transmitted, particularly causing their transmission to begin at a calculated point in time. This predetermined point in time is derived from the ATSC epoch reference and adjusted by an offset, $TimeOffset_{NS}$ 518 (FIG. 5B). Particularly, cadence generator 504 provides the startup time offset, $TimeOffset_{NS}$ 518, for any global timebase instant, such as a GPS 1 PPS instant by referencing the epoch (i.e., Jan. 6, 1980 at 00:00:00 UTC). After cadence generator initially synchronizes (or locks) the superframes to a common cadence based on the ATSC epoch (506), it maintains this relationship over time by continuously tracking the offset and correcting for any error.

Referring to FIG. 5B, equation 516 defines the superframe offset, $SuperframeOffset_{NS}$ (in nanoseconds), to the next leading edge of a global timebase pulse, such as a next GPS 1 PPS pulse. As described above, GPS receiver 502 provides an increment count every second (1 PPS). An offset calculation computed by the cadence generator 504 defines when the following global-timebase count (i.e., GPS-seconds) will occur, and causes the synchronization to start at the next rising edge of the timebase pulse signal, e.g., GPS 1 PPS pulse signal. Thus, the timebase count plus one (e.g., the next GPS seconds count) divided by the superframe period provides the number of superframes which have occurred since the ATSC epoch began.

Typically, the result of the $SuperframeOffset_{NS}$ calculation 516 will be an integer and a fraction. At any randomly selected second since the ATSC epoch, there may be a time offset between the 1 PPS and 1 PPSF (1 pulse per superframe).

The fractional portion (fraction) of equation 516 represents the offset in terms of a fraction of a superframe. The offset to the next timebase pulse rising edge (e.g., next GPS 1 PPS) is defined in equation 518 as the fractional portion of equation 516, fraction, multiplied by the superframe period ($Superframe_{Period}$). Calculation 520 is a superframe calculation for $t_1$, (514) defined as Jan. 6, 2007 at 00:00:00 UTC and calculation 522 is the corresponding time offset, $TimeOffset_{NS}$ (in nanoseconds).

FIG. 5C depicts equations showing the rational relationship between the ATSC symbol clock rate and GPS time. Equation 524 is the transport stream rate, $TS_{rate}$ as defined by the ATSC A/53 standard. Equation 526 shows the relationship of the GPS 10 MHz reference and TS rate. Equation 528 shows the relationship between the TS rate and symbol rate, $S_r$. And as shown in equation 530, there are 12,480 TS Packets in a superframe period.

From the system time metrics described above with respect to FIG. 3, it can be determined that the ATSC symbol clock pulse matches a GPS second pulse (1 PPS) every 143 seconds which is exactly $9\times171\times10^6$ nanoseconds. This correlates to $1539\times10^6$ symbols referred to as "number of symbols" or "nsym". The number of symbols per VSB field ("nf") is defined as the number of symbols per segment multiplied by the number of segments per field. Hence, nf=832 Sym/Seg×313 Seg/Field=260,416 Symbols/Field. The greatest common divisor ("GCD") [nf, nsym] is equal to 64. Thus, in 6 days, 17 hours, 37 minutes, 47 seconds there are an integer number of fields and seconds. As shown in FIG. 1, there are two fields per dataframe. Since there are 40 VSB fields per superframe ("SF"), every 38 Weeks, 3 Days, 9 Hours, 11 Minutes, 20 seconds since the ATSC epoch, the 1 PPS and 1 PPSF will be time aligned with the epoch and hence have no offset. At all other times there will be an offset, $TimeOffset_{ns}$, between 1 PPS and 1 PPSF.

By externally referencing a global timebase such as GPS, two different devices can execute phase synchronized applications. The cadence generator 504 is referenced in each device to a common epoch and a temporal (1 PPS) and frequency (10 MHz) reference. Once the initial startup offset for device is calculated and cadence generator locks, the rate is corrected (if needed) to maintain synchronization with respect to the ATSC epoch.

Figure 6:
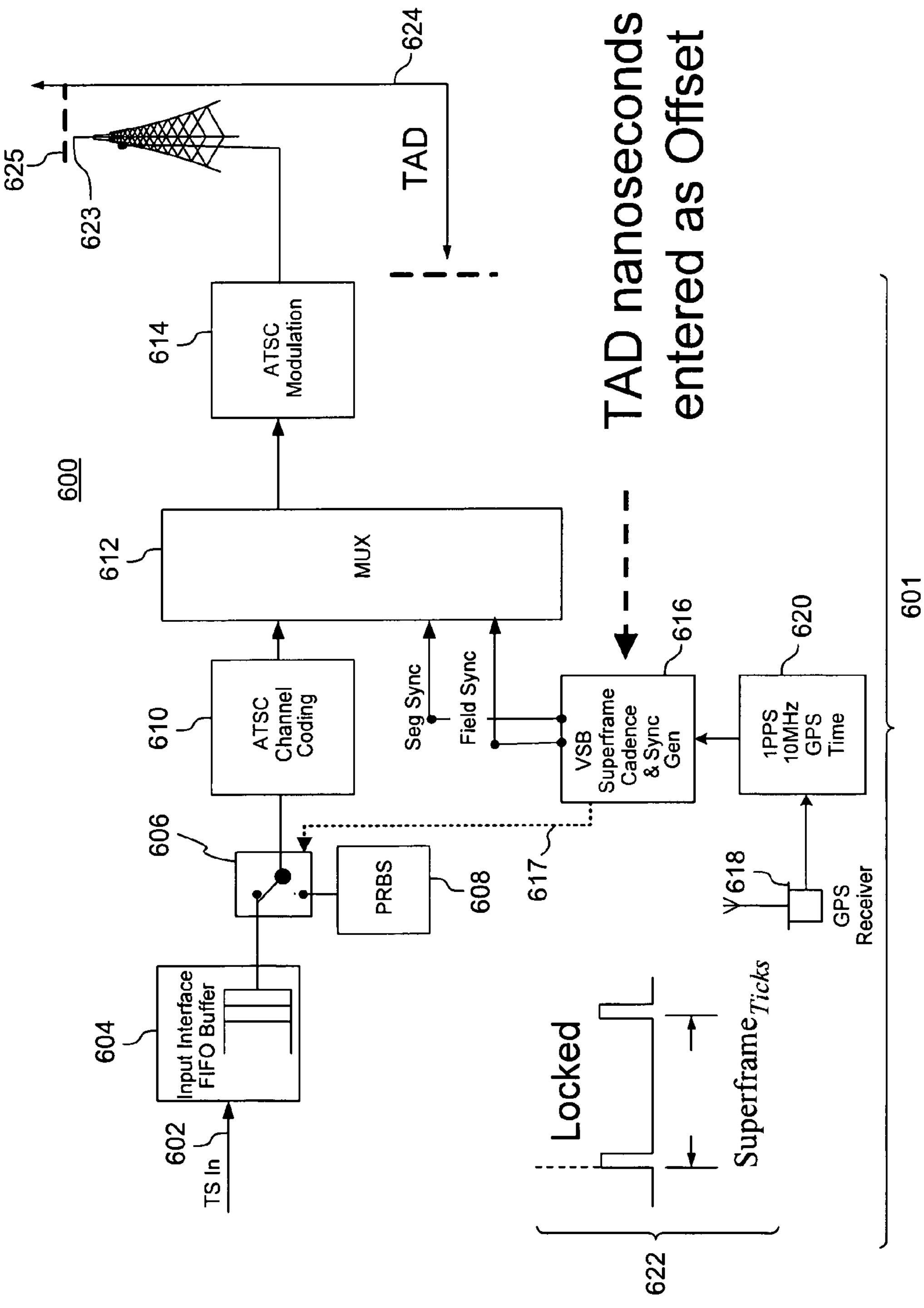
FIG. 6 depicts a block diagram of example exciter and antenna components of an ATSC DTV system in accordance with an embodiment of the present invention.

Another offset can be added to the $TimeOffset_{NS}$ to account for transmitter to antenna delay ("TAD"). FIG. 6 depicts a block diagram of example exciter 601 and antenna 623 components of an ATSC DTV system in accordance with an embodiment of the present invention. Exciter system 601, shown in an synchronized state, includes a FIFO buffer 604 which receives and buffers a transport stream 602 ("TS"). A PRBS generator 608 generates a random sequence of bits, and a switch 606 feeds either the PRBS generator 608 or the buffered transport stream from FIFO buffer 604 to a coding unit 610, which in turn is coupled to a multiplexer 612.

A global timebase receiver 618, such as a GPS receiver, receives global timebase signals 620 including a 1 pulse per second (1 PPS) timing output, standard reference output frequencies (e.g., 5 and 10 MHz) which can be used to derive the ATSC symbol clock in an exciter and the transport stream clock in an emission multiplexer (not shown), and a GPS week and time of week ("TOW") count which can be expressed as an integer corresponding to the number of seconds since the GPS epoch. As shown in FIG. 6, timebase signals 620 are fed to the cadence generator 616. Switch 606 is controlled by a cadence generator 616 via control line 617. Cadence generator 616 provides segment synchronization and field synchronization signals to multiplexer 612 in accordance with the ATSC A/53 standard. In addition, cadence generator 616 calculates timing offsets from the global timebase signals 620 to determine the instant superframes will be emitted from the air interface of antenna 623 according to the ATSC epoch. The synchronized transport streams are coded as segments by channel coding unit 610 and multiplexed into VSB frames by multiplexer 612. The VSB frames are then modulated by an ATSC modulation stage 614 to be transmitted through antenna 623 having an air interface 625.

Figure 7:
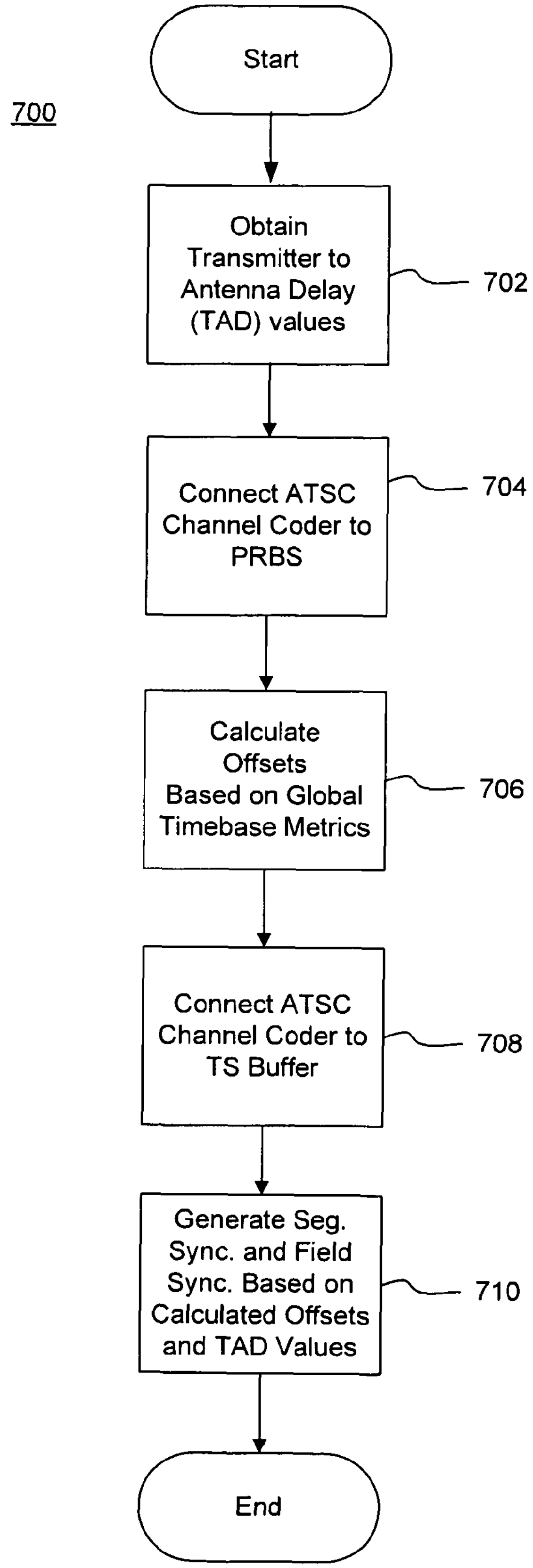
FIG. 7 depicts an example flowchart showing a procedure for locking an exciter to an ATSC system time cadence in accordance with an embodiment of the present invention.

FIG. 7 depicts an example flowchart showing a procedure for locking an ATSC superframe cadence in an exciter in accordance with an embodiment of the present invention. Referring also to FIG. 6, in block 702, the transmitter to antenna delay ("TAD") compensation values are obtained and stored in cadence generator 616. These compensation values are either calculated or measured and are specific to each transmitter site. In block 704, before transmitting VSB dataframes containing content to be synchronized, cadence generator 616 of exciter 601 actuates switch 606 via control line 617 to connect channel coding unit 610 to an internal PBRS 608 to maintain a noise-like spectrum. Switch 606 is held in this position until the VSB frames have been locked to a cadence (622) or while the transport stream is unavailable. Block 706 calculates the offsets based on the global timebase metrics as described above with respect to FIGS. 3-5. At block 708, after the VSB superframe has locked, cadence generator 616 controls switch 606 via control line 617 to connect the FIFO buffer 604 to the ATSC channel coding unit 610, as shown in FIG. 6. If the VSB frames were previously locked, and the transport stream becomes unavailable, the dataframe cadence will still remain locked, switch 606 will revert to PBRS, and the TS packets of the dataframes will simply include random data from the PBRS.

A VFIP released by an emission multiplexer (not shown) and delayed in FIFO buffer 604 by a predetermined delay value, TX $\text{Delay}_{ns}$ (defined below), will be output the instant switch 606 connects FIFO buffer 604 to channel coding unit 610. As explained above, cadence generator 616 also supplies the segment synchronization and field synchronization signals to the multiplexer 612 of exciter 601. This causes the superframe transmissions to begin at a predetermined time referenced from the ATSC epoch and takes into account the TAD values 624 stored in the cadence generator 616, as shown at block 710.

As described above with respect to U.S. patent application Ser. No. 11/422,791 a VSB frame initialization packet (VFIP) can be inserted as the last packet slot of a series of TS packets in an emission multiplexer. In addition, the A-VSB emission multiplexer inserts mobile program content into deterministic positions in a superframe.

In another embodiment of the present invention, by using a common epoch to synchronize the packet layer in the emission multiplexer and the physical layer VSB frames in an exciter, it is possible to have mobile program content inserted synchronously by the emission multiplexer to appear at the air interface of antennas at multiple stations at the same time or some known offset. This could allow two or more DTV stations with their studio and transmission towers at different geographic locations to offer A-VSB mobile applications utilizing A-VSB deterministic timing.

Figure 8:
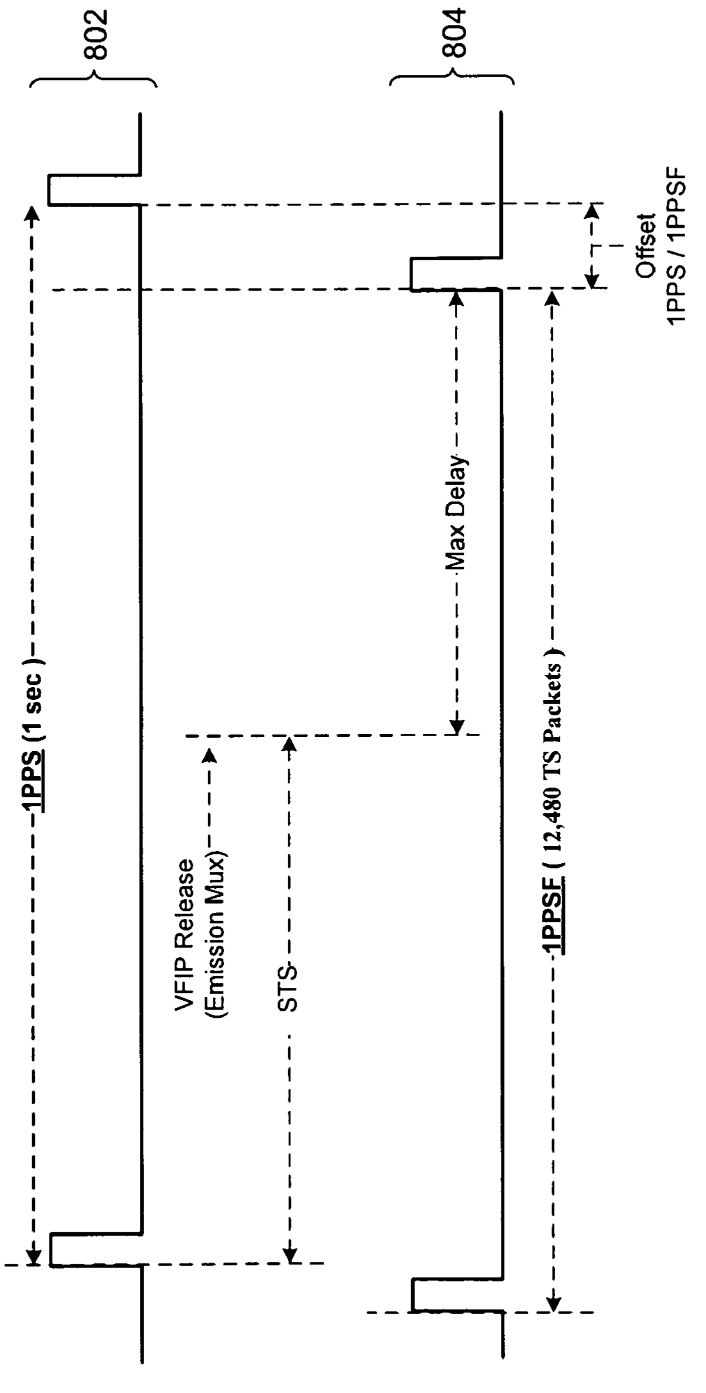
FIG. 8 depicts example timing diagrams of an emission multiplexer in accordance with an embodiment of the present invention.

FIG. 8 depicts example timing diagrams of an emission multiplexer in accordance with an embodiment of the present invention. Timeline 802 shows the GPS 1 PPS signal and timeline 804 shows the derived one pulse-per-superframe ("1 PPSF"), where each superframe has 12,480 TS packets shown by equation 530 in FIG. 5C. The emission multiplexer controls the release of a VFIP such that it is released into the distribution network at a time calculated with reference to the ATSC epoch. This startup condition causes the emission multiplexer to have a synchronized cadence. An example release time of a VFIP is shown in FIG. 8 as "VFIP release." Particularly, a VFIP is transmitted or released into distribution network at an offset with respect to the next 1 PPSF rising edge, and is defined by equation 806, where 1 PPSF ($\text{period}_{ns}$) is the above-calculated period between superframes and Max Delay is the maximum delay value of the distribution network.

Offsetting the release of a VFIP by VFIP Release allows an emission multiplexer to start up with respect to the ATSC epoch. The value of Max Delay (in nanoseconds) is a predetermined value, calculated to be larger than the transit (delay) time of the distribution network(s). If more than one station are to be synchronized, the value for Max Delay is chosen to be larger than the longest transit delay of the distribution networks involved. This common value of Max Delay is used by a cadence generator in (or coupled to) the emission multiplexers at all of the stations involved.

Figure 9A:
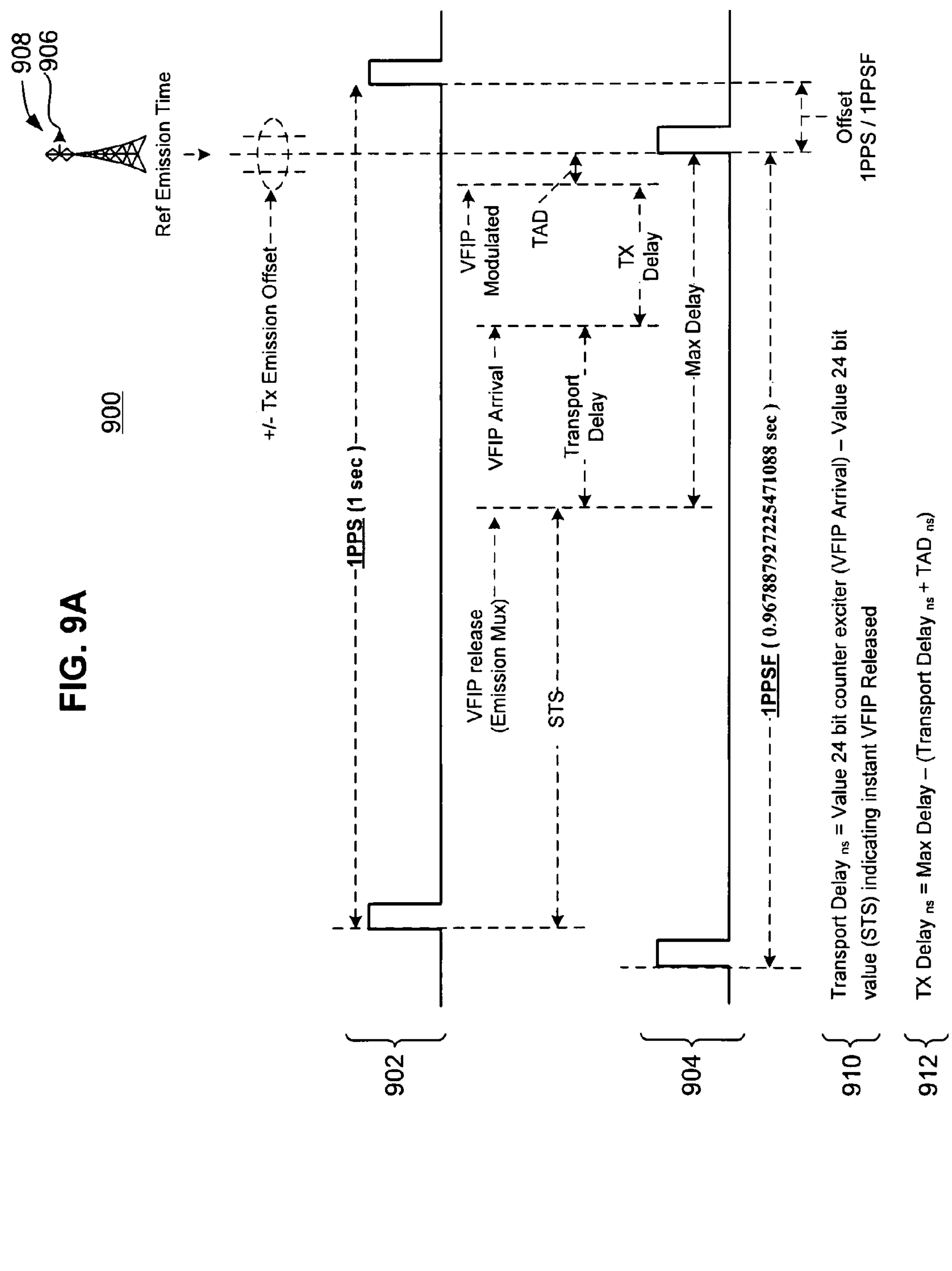
FIG. 9A depicts example timing diagrams of an exciter in accordance with an embodiment of the present invention.
Figure 9B:
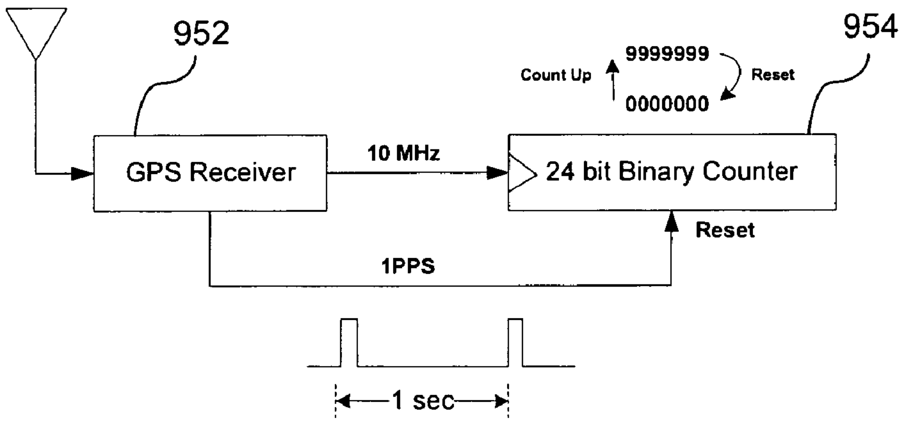
FIG. 9B PRIOR ART
FIG. 9B depicts a block diagram of a prior art timing circuit.

FIG. 9A depicts example timing diagrams of an exciter in accordance with an embodiment of the present invention. Timeline 902 shows the GPS 1 PPS signal and timeline 904 shows the derived one pulse-per-superframe ("1 PPSF") signal. To synchronize content from two geographically different stations, superframes containing the content are emitted at the air interface 906 of antenna 908 at the same time with reference to the above-defined ATSC epoch. As described above with respect to FIG. 8, a cadence generator also can be coupled to the emission multiplexer to control when VFIPs are released. A VFIP is released from the emission multiplexer into the distribution network at a precalculated time (i.e., "VFIP Release"). FIG. 9B depicts a block diagram of a prior art cyclic timing circuit 950 which can be found in ATSC DTV systems. As shown in FIG. 9B, a 24-bit binary counter 954 is driven by the GPS 10 MHz clock signal received by a GPS receiver 952. The counter 954 counts up from 0000000-9999999 in one-second intervals, then resets to 0000000 on the edge of the 1 PPS pulse received from the GPS receiver 952. Each clock tick and count advance is 100 (nanoseconds). This timing circuit 950 is used to establish in all nodes in a network and forms the basis of measuring VFIP transport delay, shown as "Transport Delay" in FIG. 9A, in distribution network. Referring back to FIG. 9A, the Synchronization Time Stamp (STS) value is a 24-bit value carried in each VFIP based on the 24-bit counter in the emission multiplexer the instant the last bit of the VFIP is released into distribution network. An exciter has a 24-bit counter as well, and the value on this counter is observed the instant the last bit of a VFIP is received (i.e., "VFIP Arrival"). The transport delay, Transport Delay, is calculated as shown by equation 910.

Figure 10:
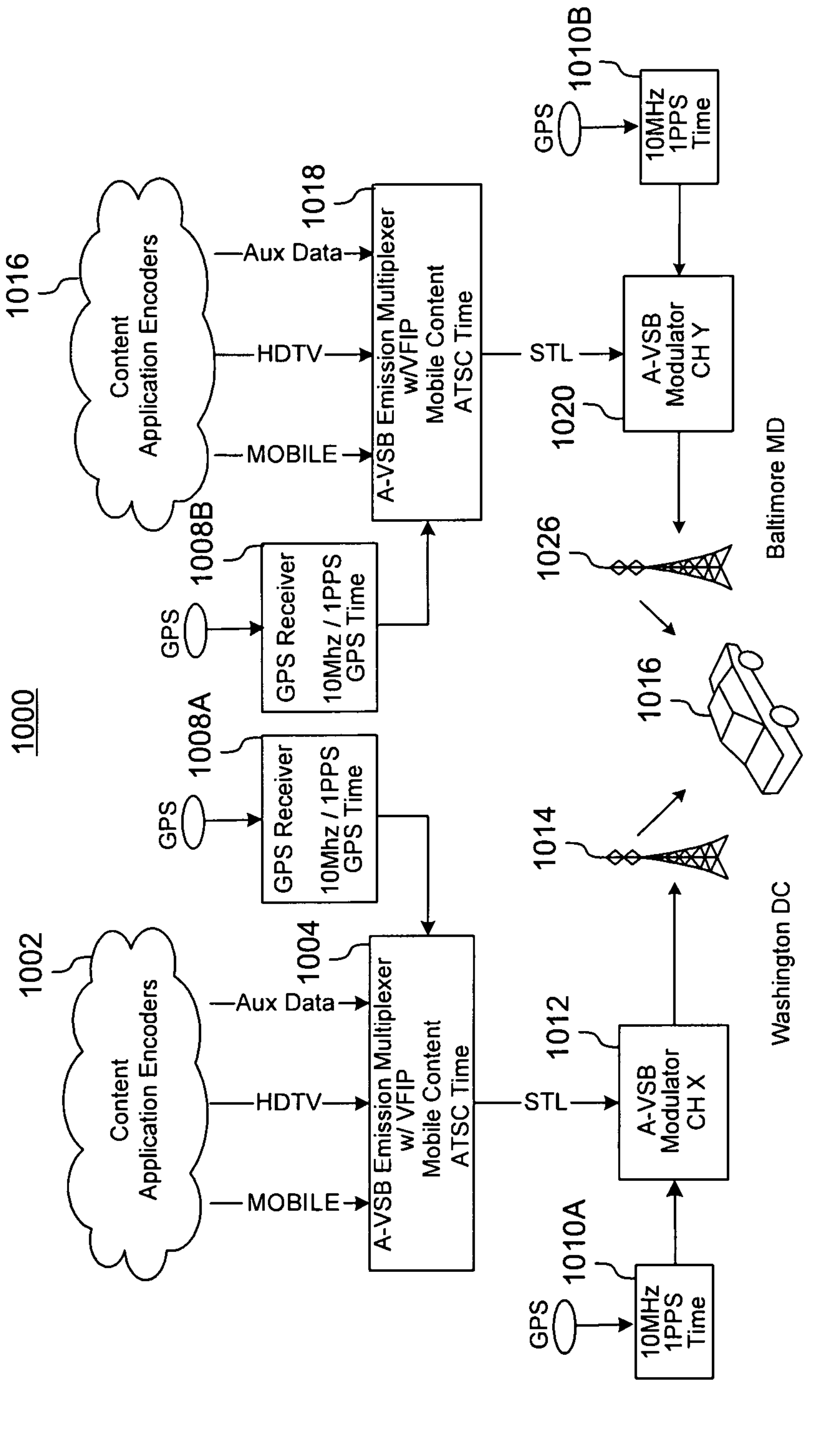
FIG. 10 depicts an example wide area service environment which provides frequency diversity and a seamless handoff in a mobile environment, in accordance with an example embodiment of the present invention.

The FIFO buffer size in the exciter is setup to equal TX Delay, as shown in FIG. 9A. The transmitter to antenna delay (TAD) is defined as a time value measured or calculated representing the time between the leading edge of a first bit of an MPEG Synch (0×47) signal which follows the last bit of a VFIP input into the ATSC data randomizer stage (e.g., channel coding unit) in an exciter. The appearance of a segment synch which represents the beginning of a superframe that is to be emitted at the antenna air interface of an antenna is shown in FIG. 4. Particularly, the leading edge (zero crossing) of the +5 to −5 transition of the symbol representing the segment synch of the DFS having no PN 63 inversion represents the beginning of a superframe with reference to the ATSC epoch. By adding a TAD value, the antenna air interface becomes the reference point. TX Delay calculated for the transmission side, particularly for the FIFO buffer, is thus defined as shown in equation 912:

FIG. 10 depicts an example of a wide area service environment 1000 which provides synchronization between two cooperating DTV stations to enable the opportunity for frequency diversity techniques and a seamless service handoff using a cognitive A-VSB receiver in a mobile environment, in accordance with an example embodiment of the present invention. A cognitive receiver is a receiver that is aware of the timing of the transmitted mobile content which could be sent in bursts, with gaps in time between bursts. The gaps provide the receiver with time to sense the reception environment and hop, if necessary, to another channel offering the best reception at its current location at an instant in time. As shown in FIG. 10, a wireless device having a cognitive receiver is in a vehicle 1016 and may require a handoff from one ATSC transmitter system to another. In this example, as the signal from Ch X tower 1014 fades, the CH Y tower 1026 signal is sensed to be stronger at a location in the overlapping coverage contours between the cities shown. The handoff enables a wireless device to handoff from one system to another (e.g., Ch X to Ch Y) without interrupting the service. The overlapping contours in a local market can also benefit from this frequency diversity to provide better quality of service.

A content application encoder pool 1002 supplies a stream containing mobile content to an emission multiplexer 1004. Another content application encoder pool 1016 supplies substantially identical mobile content to another emission multiplexer 1018. The HDTV content and auxiliary data supplied by the other application encoders can be different and asynchronous for each station and can be sent to emission multiplexers (1004, 1018), respectively, for reception by legacy ATSC receivers.

The GPS receivers (1008A, 1008B) provide timing signals to lock the transport stream clocks in each emission multiplexer and to enable the cadence generator to calculate the correct VFIP emission release time to release a VFIP into the distribution network shown here as STL (Studio to Transmitter Link). As described above with respect to FIGS. 8 and 9, a VFIP is released at a predetermined time, VFIP Release, which equals 1 PPSF ($\text{period}_{ns}$)−Max Delay. A common value of Max Delay is used by both stations. The VFIP release time calculations synchronize both transport layers. In addition, VFIP has an STS value observed on a 24-bit counter in each emission multiplexer at the instant the VFIP is released.

In this example, content application encoders 1002, 1016 provide the same mobile content at the same instant in time to the emission multiplexers 1004, 1018 which insert the mobile content in same deterministic locations in each SF. The HDTV and Auxiliary data can be different and inserted in random positions in each SF. In this example, only the mobile content is synchronized which enables different network stations (e.g., CBS, NBC, ABC, FOX, PBS, and the like) the opportunity to cooperate by allocating a portion of their respective bandwidths to provide consumers the same content in a wide area.

As explained, for example, in U.S. patent application Ser. No. 11/422,791, a dynamic variable delay exists between an emission multiplexer and an exciter. The VFIP STS value is used to calculate the transport delay, $\text{Transport Delay}_{ns}$, from each emission multiplexer 1004, 1018 to each respective exciter 1012, 1020. As described above, $\text{Transport Delay}_{ns}$ is defined as follows: $\text{Transport Delay}_{ns}$=Value 24-bit counter exciter (VFIP Arrival)−Value 24-bit value (STS), where STS indicates the instant a VFIP was released ("VFIP Release"). The transport delay values (i.e., $\text{Transport Delay}_{ns}$) to each exciter will be different because of the different distribution lengths or the type of network distribution link (e.g., fiber, microwave, satellite).

Cadence generators (not shown) in the exciters 1012, 1020 calculate system time metrics based on global timebase signals received by their respective global timebase receivers 1010A, 1010B. The offset calculated for channel X also can be calculated by the cadence generator for channel Y, permitting the physical layer VSB Frames of different stations to become phase synchronized. Particularly, the cadence and synchronization generators in each exciter 1012, 1020 store the TAD value which was measured or calculated between each exciter and the antenna air interface 1014, 1026 of each station. The FIFO buffer size in each exciter 1012, 1020 is set to equal the TX Delay (defined above with respect to FIG. 9A as $\text{TX Delay}_{ns}$=Max Delay−($\text{Transport Delay}_{ns}$+$\text{TAD}_{ns}$). This compensates for differences in transport delay and sets the air interface of the antenna as a reference for the calculations.

Mobile content from two stations will be transmitted at the air interface of antennas 1014, 1026 at the same instant or with a deterministic offset that can be controlled and known to a cognitive receiver (e.g., 1016). If the mobile content is time sliced or bursted with gaps in transmission (i.e., an attribute of A-VSB, for example), these gaps will provide the cognitive receivers time to sense the reception environment and provide for frequency diversity techniques or a seamless handoff to a mobile receiver as it moves between stations.

Figure 11:
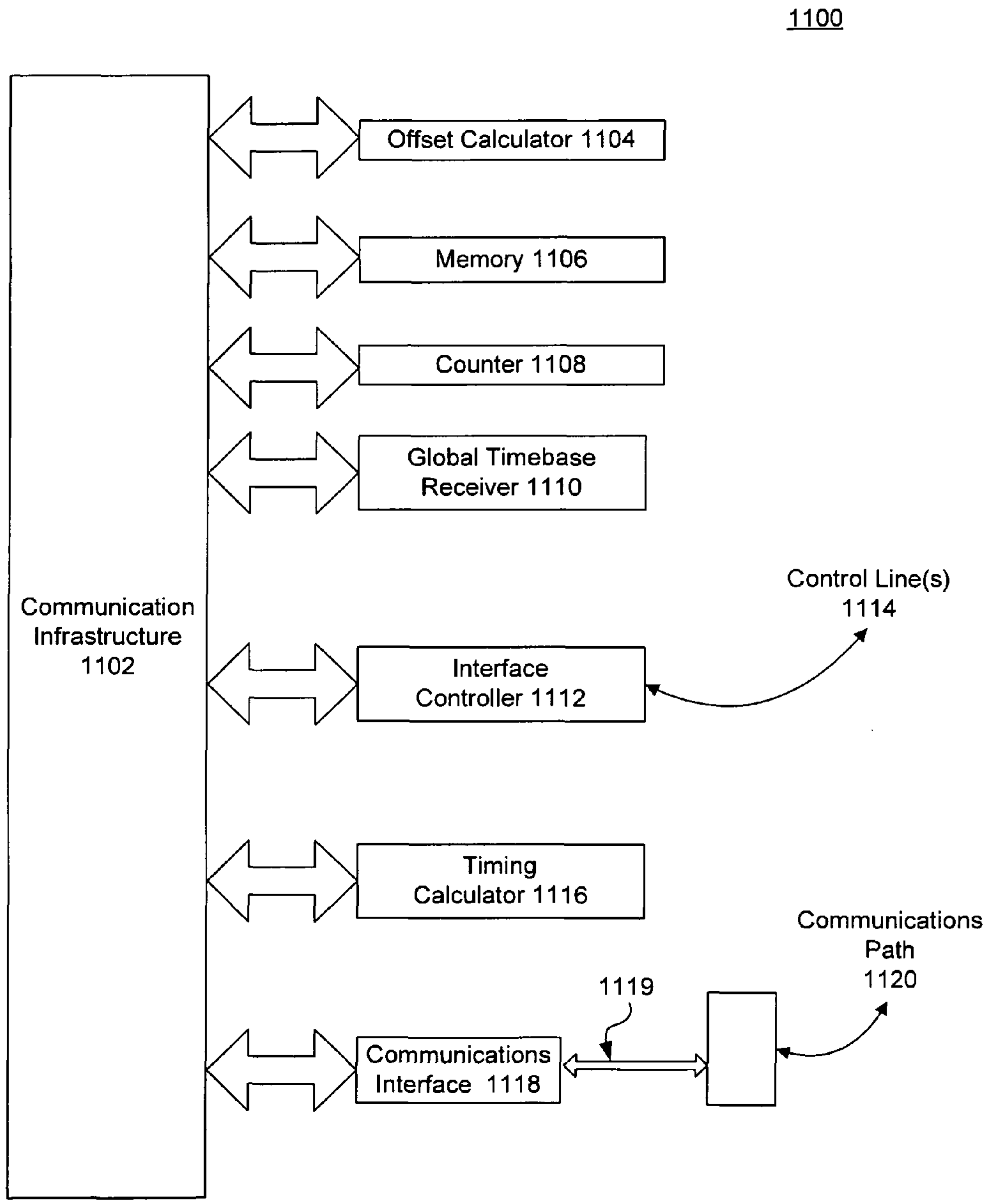
FIG. 11 is a collaboration diagram of functional and hardware modules deployed on a system for synchronizing the emission of data packets in accordance with an example embodiment of the present invention.

FIG. 11 is a collaboration diagram 1100 of functional and hardware modules deployed on a system for synchronizing the emission of data packets in accordance with an example embodiment of the present invention. The functional modules include a global timebase receiver 1110 which receives global timebase signals. As explained above, these signals can be GPS signals including GPS time (i.e., weeks, time of week ("TOW") in seconds), a 10 MHz signal, and a clock pulse of 1 pulse per second (1 PPS).

In one embodiment, the functional modules also include an offset calculator 1104 which calculates an offset based on the received global timebase signals. A timing calculator 1116 uses the offsets calculated by offset calculator 1104 to determine the specific time a physical layer dataframe (e.g., 8-VSB or A-VSB) should be released. As explained above, offsets can change. Timing calculator 1116 further maintains the cadence of subsequent dataframes based on the calculated offsets received from offset calculator 1104. An interface controller 1112 is communicatively coupled to the ATSC subsystem (e.g., to or within an exciter component, not shown) via control line(s) 1114 and can transmit signals to control the release of physical layer dataframes.

In another embodiment, timing calculator 1116 uses calculated offsets to synchronize packets carrying program content, such that when the packets are encapsulated into dataframes by an exciter, the content will be emitted from the air interface of respective antennas at substantially the same time or some predetermined offset. In this embodiment offset calculator 1104 calculates an offset referenced with respect to a global timebase epoch. The offset is processed by timing calculator 1116, which in turn sends a signal to interface controller 1112 to send control signals via control line(s) 1114. Control lines 1114 are coupled to an emission multiplexer and control the release of a VFIP such that it is released into the distribution network at a time calculated with reference to the ATSC epoch. A memory 1106 is used to store data such as $\text{TX Delay}_{ns}$, Max Delay, $\text{Transport Delay}_{ns}$, TAD, STS, VFIP Release, and other variables, constants, and equations described above, and is accessible by the computation modules such as offset calculator 1104 and timing calculator 1116.

In addition, a communications interface 1118 allows software and data to be transferred between the various computation modules and external devices. Software and data transferred via communications interface 1118 are in the form of signals 1119 which may be electronic, electromagnetic, optical or other signals capable of being received by communications interface 1118. These signals 1119 are provided to communications interface 1118 via a communications path (e.g., channel) 1120. Channel 1120 carries signals 1119 and may be implemented using wire or cable, fiber optics, a telephone line, a cellular link, a radio frequency (RF) link and other communications channels.

A communication infrastructure 1102 (e.g., a communications bus, cross-over bar, or network) can be used to couple the various computational modules as shown in FIG. 11.

The present invention (i.e., systems 200, 600, 1000 and 1100, process 700, or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Software embodiments of example aspects of the present invention may be provided as a computer program product, or software, that may include an article of manufacture on a machine accessible or machine readable medium (memory) having instructions. The instructions on the machine accessible or machine readable medium may be used to program a computer system or other electronic device. The machine-readable medium may include, but is not limited to, floppy diskettes, optical disks, CD-ROMs, and magneto-optical disks or other types of media/machine-readable medium suitable for storing or transmitting electronic instructions.

The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result. In other embodiments, functions performed by software can instead be performed by hardcoded modules, and thus the invention is not limited only for use with stored software programs.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above-described example embodiments, but should be defined only in accordance with the following claims and their equivalents.

In addition, it should be understood that FIGS. 1-11 are presented for example purposes only. The architecture of the example embodiments presented herein is sufficiently flexible and configurable, such that it may be utilized (and navigated) in ways other than those shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. An apparatus for causing a dataframe to be emitted at an air interface of an antenna, comprising:
- a memory configured to store a transmission to antenna delay value (TAD);
- at least one processor operable to function as:
  - an offset calculator configured to calculate an offset value based on an epoch of a global timebase generator and the transmission to antenna delay value (TAD); and
  - an interface controller in communication with the offset calculator and configured to communicate a segment synchronization signal and a field synchronization signal based on the offset value.

2. The apparatus according to claim 1, wherein the interface controller is further operable to release a transport stream of packets from a buffer when the dataframe is in cadence with the epoch.

3. The apparatus according to claim 2, wherein the dataframe is a superframe.

4. The apparatus according to claim 1, wherein the offset is referenced to a next edge of a pulse signal from the global timebase.

5. The apparatus according to claim 1, further comprising:
- the memory further configured to store a predetermined maximum delay value (Max Delay) corresponding to a value of time greater than the longest delay through a plurality of distribution networks;
- a cyclic counter, synchronized with at least one signal of the global timebase, and configured to increment a count value;
- a timing calculator configured to calculate the difference between a synchronization time stamp (STS) in a predetermined transport stream packet and the count value at the instant the predetermined transport stream packet is received, wherein the difference is a transport delay time (Transport Delay) across a distribution network; and wherein the timing calculator is further configured to calculate a buffer delay value (TX Delay =Max Delay−(Transport Delay +TAD)).

6. The apparatus according to claim 5, wherein the at least one signal of the global timebase comprises a reference signal and a pulse signal.

7. A method for causing a dataframe to be emitted at an air interface of an antenna, comprising:

storing a transmission to antenna delay value (TAD);

calculating an offset value based on an epoch of a global timebase generator and the transmission to antenna delay value (TAD); and communicating a segment synchronization signal and a field synchronization signal based on the offset value.

8. The method according to claim 7, further comprising:

releasing a transport stream of packets from a buffer when a dataframe is in cadence with the epoch.

9. The method according to claim 8, wherein the dataframe is a superframe.

10. The method according to claim 7, wherein the offset is referenced to a next edge of a pulse signal from the global timebase.

11. The method according to claim 7, further comprising:

storing a predetermined maximum delay value (Max Delay) corresponding to a value of time greater than the longest delay through a plurality of distribution networks;

synchronizing a cyclic counter with at least one signal of the global timebase and incrementing a count value;

calculating the difference between a synchronization time stamp (STS) in a predetermined transport stream packet and the count value at the instant the predetermined transport stream packet is received, wherein the difference is a transport delay time (Transport Delay) across a distribution network; and calculating a buffer delay value (TX Delay=Max Delay−(Transport Delay+TAD)).

12. The method according to claim 11, wherein the at least one signal of the global timebase comprises a reference signal and a pulse signal.

13. A non-transitory computer-readable medium having stored thereon sequences of instructions, the sequences of instructions including instructions which when executed by a computer system causes the computer system to perform:

storing a transmission to antenna delay value (TAD);

calculating an offset value based on an epoch of a global timebase generator and the transmission to antenna delay value (TAD); and communicating a segment synchronization signal and a field synchronization signal based on the offset value.

14. The computer-readable medium according to claim 7, further comprising instructions which, when executed by the computer system, causes the computer system to perform:

releasing a transport stream of packets from a buffer when a dataframe is in cadence with the epoch.

15. The computer-readable medium according to claim 14, wherein the dataframe is a superframe.

16. The computer-readable medium according to claim 13, wherein the offset is referenced to a next edge of a pulse signal from the global timebase.

17. The computer-readable medium according to claim 13, further comprising instructions which, when executed by the computer system, causes the computer system to perform:

storing a predetermined maximum delay value (Max Delay) corresponding to a value of time greater than the longest delay through a plurality of distribution networks;

synchronizing a cyclic counter with at least one signal of the global timebase and incrementing a count value;

calculating the difference between a synchronization time stamp (STS) in a predetermined transport stream packet and the count value at the instant the predetermined transport stream packet is received, wherein the difference is a transport delay time (Transport Delay) across a distribution network; and calculating a buffer delay value (TX Delay=Max Delay−(Transport Delay+TAD)).

18. The computer-readable medium according to claim 17, wherein the at least one signal of the global timebase comprises a reference signal and a pulse signal.

* * * * *

UNITED STATES PATENT AND TRADEMARK OFFICE

CERTIFICATE OF CORRECTION

PATENT NO. : 8,149,817 B2
APPLICATION NO. : 12/024238
DATED : April 3, 2012
INVENTOR(S) : Michael Simon et al.

It is certified that error appears in the above-identified patent and that said Letters Patent is hereby corrected as shown below:

In the Specification

COLUMN 2

Line 43, "config-" should be deleted.

COLUMN 5

Line 27, "time to" should read --time $t_o$--.

COLUMN 6

Line 35, "20 seconds" should read --20 Seconds--.
Line 52, "an" should read --a--.

COLUMN 9

Line 23, "handoff" should read --hand off--.

COLUMN 11

Line 39, "machine acces-" should read --machine-acces- --.
Line 40, "machine readable" should read --machine-readable--.
Line 49, ""machine accessible" should read --"machine-accessible--; and Signed and Sealed this
Nineteenth Day of November, 2013

Teresa Stanek Rea
*Deputy Director of the United States Patent and Trademark Office*

In the Claims

<u>COLUMN 14</u>

Claim 13 Line 4, “causes” should read --cause--.
Claim 14 Line 12, “causes” should read --cause--.
Claim 17 Line 22, “causes” should read --cause--.